(12) United States Patent
Meffert et al.

(10) Patent No.: US 11,400,403 B2
(45) Date of Patent: Aug. 2, 2022

(54) HOLLOW FILTER ELEMENT AND FILTER DEVICE FOR FILTERING AIR

(71) Applicant: Daimler AG, Stuttgart (DE)

(72) Inventors: Thomas Meffert, Neulussheim (DE);
Ralf Thomas Nawroth, Weinstadt (DE)

(73) Assignee: Daimler AG, Stuttgart (DE)

( * ) Notice: Subject to any disclaimer, the term of this patent is extended or adjusted under 35 U.S.C. 154(b) by 210 days.

(21) Appl. No.: 16/500,062

(22) PCT Filed: Apr. 10, 2018

(86) PCT No.: PCT/EP2018/059068
§ 371 (c)(1),
(2) Date: Oct. 1, 2019

(87) PCT Pub. No.: WO2018/189129
PCT Pub. Date: Oct. 18, 2018

(65) Prior Publication Data
US 2020/0054981 A1 Feb. 20, 2020

(30) Foreign Application Priority Data

Apr. 12, 2017 (DE) .................. 10 2017 003 551.2

(51) Int. Cl.
*B01D 46/24* (2006.01)
*B01D 46/42* (2006.01)
(Continued)

(52) U.S. Cl.
CPC ..... *B01D 46/4227* (2013.01); *B01D 46/0005* (2013.01); *B01D 46/2403* (2013.01);
(Continued)

(58) Field of Classification Search
CPC ............ B01D 46/0005; B01D 46/2403; B01D 46/2414; B01D 46/4227; B01D 46/521;
(Continued)

(56) References Cited

U.S. PATENT DOCUMENTS

| | | | |
|---|---|---|---|
| 6,200,465 B1 * | 3/2001 | Carawan .............. | B01D 46/008 210/238 |
| 6,627,078 B1 * | 9/2003 | Wagner .................. | B01D 29/21 210/238 |

(Continued)

FOREIGN PATENT DOCUMENTS

| | | |
|---|---|---|
| CN | 1474714 A | 2/2004 |
| CN | 201065800 Y | 5/2008 |

(Continued)

OTHER PUBLICATIONS

PCT/EP2018/059068, International Search Report dated Jul. 2, 2018 (Two (2) pages).
(Continued)

*Primary Examiner* — Minh Chau T Pham
(74) *Attorney, Agent, or Firm* — Crowell & Moring LLP

(57) ABSTRACT

A hollow filter element for inserting into a filter device for filtering air, in particular of an internal combustion engine of a motor vehicle, includes a filter material which is held on the end face by a planar surround in a sealed manner. The planar surround has at least one grip recess for handling the hollow filter element. A filter device having such a hollow filter element includes a housing having a housing base part and a housing cover. The housing cover has at least one pin which, upon correct installation of the hollow filter element in the housing base part and when the housing cover is placed on the housing base part, projects into the grip recess of the planar surround.

6 Claims, 2 Drawing Sheets

(51) Int. Cl.
*F02M 35/02* (2006.01)
*F02M 35/024* (2006.01)
*B01D 46/00* (2022.01)

(52) U.S. Cl.
CPC .. *F02M 35/0201* (2013.01); *F02M 35/02416* (2013.01); *F02M 35/02483* (2013.01); *B01D 2265/026* (2013.01); *B01D 2279/60* (2013.01)

(58) Field of Classification Search
CPC ........ B01D 2265/026; B01D 2275/203; B01D 2279/60; F02M 35/0201; F02M 35/02416; F02M 35/02425
USPC ............. 55/385.3, 498, 502, 357; 123/198 E
See application file for complete search history.

(56) References Cited

U.S. PATENT DOCUMENTS

| | | | |
|---|---|---|---|
| 6,977,006 B2 | 12/2005 | Reid | |
| 8,709,248 B2* | 4/2014 | Savage | B01D 46/4227 210/238 |
| 9,233,330 B2* | 1/2016 | Dworatzek | B01D 46/0005 |
| 10,159,923 B2* | 12/2018 | Ruhland | B01D 46/0005 |
| 10,232,294 B2* | 3/2019 | Dworatzek | B01D 45/04 |
| 11,007,462 B2* | 5/2021 | Coulonvaux | F02M 35/024 |
| 2004/0134171 A1* | 7/2004 | Scott | B01D 46/521 55/482 |
| 2006/0086075 A1* | 4/2006 | Scott | B01D 46/0001 55/498 |
| 2008/0190082 A1* | 8/2008 | Scott | B01D 46/2414 55/520 |
| 2009/0014375 A1* | 1/2009 | Savage | B01D 46/4227 210/238 |
| 2009/0249754 A1* | 10/2009 | Amirkhanian | B01D 46/008 55/357 |
| 2013/0232934 A1 | 9/2013 | Baseotto | |
| 2014/0174296 A1* | 6/2014 | Schultz | B01D 46/0004 96/226 |
| 2015/0013282 A1* | 1/2015 | Sorger | B01D 46/10 55/357 |
| 2015/0113931 A1 | 4/2015 | Bartel et al. | |
| 2016/0220935 A1* | 8/2016 | Ruhland | B01D 46/0005 |
| 2019/0105592 A1* | 4/2019 | Evcuemen | B01D 46/4227 |
| 2020/0086262 A1* | 3/2020 | Zhao | B01D 46/0002 |
| 2021/0321844 A1* | 10/2021 | Seasholtz | B01D 46/0005 |
| 2021/0322916 A1* | 10/2021 | Merton | B01D 46/0036 |

FOREIGN PATENT DOCUMENTS

| | | |
|---|---|---|
| CN | 105263600 A | 1/2016 |
| CN | 205714510 U | 11/2016 |
| DE | 41 11 447 A1 | 10/1992 |
| DE | 196 08 589 A1 | 9/1997 |
| DE | 298 08 779 U1 | 7/1998 |
| DE | 10 2009 016 648 A1 | 10/2009 |
| DE | 10 2014 001 608 A1 | 8/2014 |
| DE | 10 2016 000 575 A1 | 8/2016 |
| EP | 0 956 892 A1 | 11/1999 |
| EP | 1 769 835 B1 | 4/2007 |
| EP | 2 535 550 A2 | 12/2012 |
| WO | WO 00/50152 A1 | 8/2000 |
| WO | WO 2018/044312 A1 | 3/2018 |
| WO | WO 2018/067988 A1 | 4/2018 |

OTHER PUBLICATIONS

German-language European Office Action issued in European application No. 18 724 458.7-1104 dated Oct. 29, 2020 (Four (4) pages).
Chinese Office Action issued in Chinese application No. 201880024333.4 dated Dec. 28, 2020, with partial English translation (Thirteen (13) pages).

* cited by examiner

HOLLOW FILTER ELEMENT AND FILTER DEVICE FOR FILTERING AIR

BACKGROUND AND SUMMARY OF THE INVENTION

The invention relates to a hollow filter element for inserting into a filter device for filtering air, in particular of an internal combustion engine, in particular of a motor vehicle, the hollow filter element comprising a filter material which is arranged around a cavity, and the filter material being sealingly held on least one end face by a planar surround. Furthermore, the invention relates to a filter device for filtering air, in particular of an internal combustion engine, in particular of a motor vehicle, which device uses a hollow filter element of this kind, the filter device having a housing, which comprises a housing base part which has an air outlet, and a housing cover which has an air inlet and can be placed on the housing base part, and it being possible to arrange the hollow filter element in the housing such that the filter element separates the air inlet, for the air which is to be filtered, from the air outlet for filtered air.

Such hollow filter elements and filter devices of motor vehicles, in particular cars, are known from the prior art, in particular from the series construction of vehicles. The hollow filter element in this case has a filter material, through which air can flow, for filtering the air, it being possible to arrange the hollow filter element in the housing of the filter device such that the hollow filter element separates an air inlet of the housing from an air outlet of the housing, such that the ambient air flowing through the air inlet on what is referred to as the raw air side can only flow through the filter material, and then, purified, can flow to the air outlet on what is referred to as the clean air side, from where it is conveyed to the internal combustion engine of the motor vehicle. The housing consists in this case of a housing base part which has an opening into which the hollow filter element can be inserted, and a housing cover, by means of which the housing is covered and sealed.

The hollow filter element is usually designed such that a planar filter material is arranged around a central cavity, for example as bellows or in wound layers. The end faces of the material, which is arranged annularly in the broadest sense, i.e., not necessarily circularly, are surrounded by a sealing material, e.g., by what are known as end plates, such that the air which is to be cleaned cannot escape past the filter material to the clean air side. In this case, the air flow initially passes from the air inlet into the cavity surrounded by the filter material and thus arrives at the filter material. The surrounds or end plates on the end face, on which surrounds or plates the filter material is sealingly held, can, for example, be made of airtight foam-like material, or of an inherently rigid plastics material, or of a combination of the two.

Because hollow filter elements have to sit very tightly in the housing in order to fulfill their function, removal—for example, in the case of maintenance—when the filter element is to be replaced with a new, unused filter element, is not readily accomplished without effort.

EP 1 769 835 B1 discloses a hollow filter element of the type described above which, for the purpose of improved handling when the filter element is removed from the filter housing, has a gripping apparatus on the end face of the filter element that faces the filter housing opening. The gripping apparatus in this case spans the cavity through which the air flows in from the air inlet.

For easier removal of a hollow filter element from a housing base, DE 10 2016 000 575 A1 likewise proposes a gripping apparatus on the end face of the hollow filter element that faces the filter housing opening, it being possible for the gripping apparatus to be folded out of the cross section of the cavity as far as possible when not in use.

The problem addressed by the present invention is that of further developing a hollow filter element and a filter device such that simple and safe handling of the filter element during removal and installation is made possible without interfering with the airflow.

As already described in the introduction, hollow filter elements which are purposed for interchangeably inserting into a filter device for filtering air, in particular of an internal combustion engine, in particular of a motor vehicle, are designed such that the hollow filter element comprises a filter material which is arranged around a cavity, the filter material being sealingly held on at least one end face by a planar surround. According to the invention, the surround has at least one grip recess for handling the filter element.

According to invention, the grip recess allows a person to safely grasp the hollow filter element on the surround, for example by inserting the index finger into the grip recess and pressing laterally against the surround from the cavity using the thumb. The thumb can also be put into the grip recess, and the surround can be gripped by the rest of the fingers pushing thereagainst from the cavity. The filter element can thus be quickly inserted into a filter housing or removed therefrom by means of the grip recess, without further equipment or tools. Furthermore, according to the invention, the grip recess does not impede a supply of air into the cavity, since the recess is located outside the cavity cross section.

In a further embodiment of the hollow filter element, the surround has a plurality of grip recesses for handling the filter element. If at least two grip recesses are provided in the surround, then the hollow filter element can advantageously be handled using both hands. This applies in particular when the grip recesses are fitted far apart from each other in the surround, because a balance can then be produced particularly well when handling using both hands. If more than two grip recesses are provided, then the most favorable gripping variant can be situationally selected for the installation or removal of the filter element.

In the case of a surround, which is point-symmetrical with respect to a center on a central axis of the hollow filter element, in a further embodiment of the hollow filter element, the grip recesses—based on a 180° rotation of the hollow filter element about the central axis—can preferably be arranged asymmetrically in the surround. An asymmetric arrangement of the grip recesses supports—also with respect to an optical orientation—a specified installation, in particular a specified reinstallation of the hollow filter element in the filter device. The hollow filter element is not always removed from the filter device only in order to be exchanged with a new hollow filter element. Occasionally, a hollow filter element can also be removed temporarily—for reasons of inspection or accessibility of the filter device. Since any seals located on the hollow filter element can "sit" on the filter device, with respect to a corresponding sealing geometry, when the filter element is being used, it is advantageous if, when the hollow filter element is reused, it can be inserted into the filter device in exactly the same orientation as before the removal, because an optimal sealing between the filter element and filter device can be ensured in this way. An asymmetrical arrangement of the grip recesses facilitates the correct orientation in this case.

In an advantageous embodiment of the hollow filter element at least one grip recess is designed as an inherently rigid insertion part. If the surround of the filter material consists of a yielding plastics material, for example, it is advantageous for the safe handling of the filter element if the grip recess is made of a less yielding material. In this case, the grip recess can then, for example, be produced separately as a thimble-like or small tubular form, and be suitably integrated into the surround.

In a further embodiment of the hollow filter element, at least one grip recess is undercut. The handling of the filter element during installation and removal is further optimized by means of an undercut on the grip recess, because the filter element which is gripped by the fingers of a person is well secured against slipping as a result.

The invention also includes a filter device for filtering air, in particular of an internal combustion engine, in particular of a motor vehicle, the filter device having a housing, which comprises a housing base part which has an air outlet, and a housing cover, which has an air inlet and can be placed on the housing base part.

The hollow filter element described above can be arranged in the housing such that the filter element separates the air inlet, for air which is to be filtered, from the air outlet for filtered air, the housing cover having, according to the invention, at least one pin which, when the hollow filter element is correctly installed in the housing base part and the housing cover is placed on the housing base part, projects into a grip recess of the surround of the filter material, which grip recess is associated with the pin.

In this case, the pin arranged on the housing cover is at least partially received in the grip recess associated therewith. If the filter element has not been correctly inserted into the housing, the pin cannot be moved into the grip recess associated therewith, and rather the pin collides with the raised surround, which is raised with respect to the grip recess, such that the housing cover cannot be assembled on the housing base part. In this way, a specified installation position of the hollow filter element in the filter device—more precisely in the housing base part—can be ensured, which position, as already described above, is particularly important when reinstalling the hollow filter element. In particular, when a plurality of pins and the grip recesses associated therewith are present, the asymmetrical arrangement described above in connection with the hollow filter element can be used advantageously, having the same advantages with respect to a specified installation or reinstallation of the filter element. The specified installation is also particularly important in hollow filter elements that are matched to asymmetrical geometric conditions in the housing base part.

In a further embodiment of the filter device, at least one pin is so long that pressure is to be exerted on the associated grip recess thereby. In addition to mounting the hollow filter element correctly, in this way it is advantageously possible to press the hollow filter element particularly securely into its position and thus to seal against the housing, especially when a plurality of pins are present and interact with the grip recesses associated with the pins.

Further advantages, features and details of the invention can be found in the following description of preferred embodiments and with reference to the drawings. The features and feature combinations mentioned above in the description, as well as the features and feature combinations mentioned below in the description of the drawings and/or shown in the drawings alone cannot only be used in each of the disclosed combinations, but also in other combinations or in isolation, without departing from the scope of the invention.

DETAILED DESCRIPTION OF THE DRAWINGS

Figure 1:
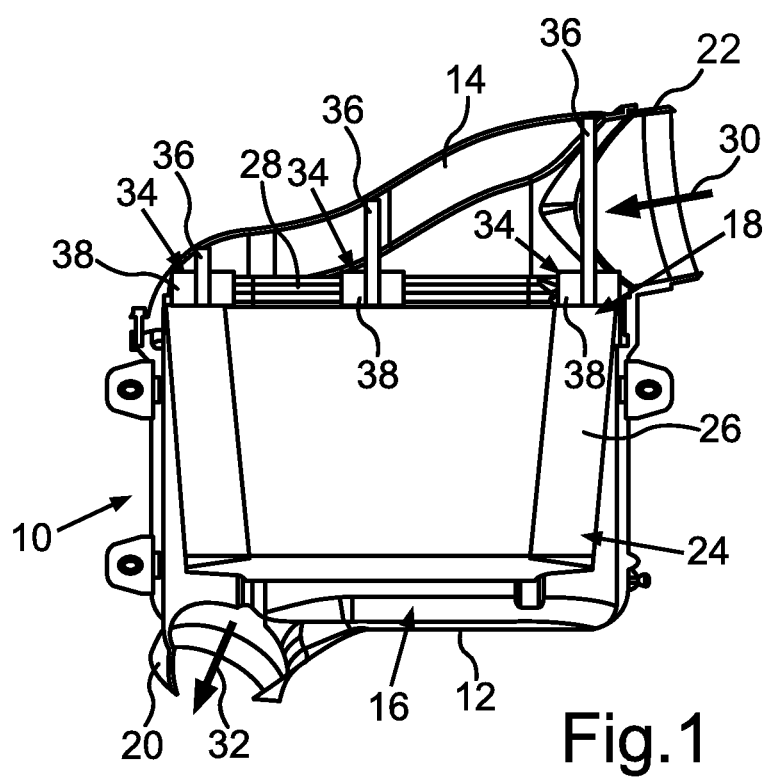
FIG. 1 is a schematic and sectional side view of a filter device according to the invention that has a hollow filter element according to the invention inserted therein.

In the drawings, identical or functionally identical elements are provided with the same reference signs.

FIG. 1 shows a schematic and sectional side view of a filter device for a motor vehicle that is denoted by the reference numeral 10. The motor vehicle is designed, for example, as a commercial vehicle or commercial car and has an internal combustion engine, by means of which the motor vehicle is driven. The internal combustion engine in this case is supplied with air, which is conveyed through an intake tract to the combustion chambers of the internal combustion engine. The filter device 10 forms a portion of the intake tract and is used to filter the air flowing to the combustion chambers.

The filter device 10 has a housing which comprises a housing base part 12 and a housing cover 14 which can be placed on the housing base part. The housing base part 12 and the housing cover 14 together form the housing of the filter device. The housing base part 12 is provided with a nozzle-shaped air outlet 20, and the housing cover 14 has a nozzle-shaped air inlet 22. The housing base part 12 and the housing cover 14 can be made of a plastics material, for example.

The housing base part 12 forms a receiving space 16 which has an opening 18 for receiving a hollow filter element 24. It can be seen from FIG. 1 that the hollow filter element 24 can be arranged in the housing base part 12, in particular in the receiving space 16. When the filter device 10 is in a fully assembled state, the hollow filter element 24 is completely arranged in the housing base part 12, i.e., in the receiving space 16. Furthermore, when the filter device in the completely assembled state, the housing cover 14 is connected to the housing base part 12, the opening 18 being covered by the housing cover 14. When the filter device is in the fully assembled state, the hollow filter element 24 separates the air inlet 22 for air which is to be filtered, which is drawn in from the surroundings, from the air outlet 20 for filtered air, which flows to the combustion chambers. The hollow filter element 24 has a filter material 26 through which air can flow, for filtering the air. The filter material 26 is arranged annularly in the broadest sense—i.e., not necessarily circularly or convexly over the entire circumference—around a central cavity 44, through which air can flow.

In FIG. 1, the unfiltered air, also referred to as raw air, which flows through the air inlet nozzle 22 into the receiving space 16, in which the hollow filter element 24 is inserted, via the central cavity 44 to the filter material 26 of the hollow filter element 24, is illustrated by an arrow 30. The raw air flows through the filter material 26 and is thereby filtered by the filter material 26. After passing through the filter material 26, the purified air—also referred to as clean air—flows to the air outlet nozzle 20, as illustrated in FIG. 1 by an arrow 32. The purified air arrives at the internal combustion engine via the air outlet 20.

The hollow filter element 24 has—at least at the end face thereof which faces the opening 18—a surround 28 which seals and holds the filter material 26 and is made of a plastics material, for example.

This surround 28 usually consists of a flexible plastics material, e.g., a plastics foam. It is also conceivable, however, that the surround 28 consists of a stronger plastics material, or that the softer plastics material which seals the filter material 26 is additionally covered by a material made of a harder plastics material, as an end plate. In an end plate of this kind that then, together with the seal which is under the plate, forms the surround 28, the grip recesses 34 which are to be provided can be integrally formed—for example, when producing the surround 28 as an injection molded part.

As further shown in FIG. 1, the opening of the grip recesses 34 can be undercut, i.e., having a—not necessarily completely encircling—inwardly directed edge, such that an engaging finger or thumb finds an improved hold when lifting the filter element 24.

If the surround 28 of the filter element 24 is formed exclusively—without an additional cover—from a softer plastics material which seals the filter material 26 at the top, the grip recesses 34 can therefore advantageously be produced as insertion parts 38 which are made of a harder material and are inserted into the softer surround 28. The relevant insertion part 38 is then designed to be tubular or thimble-like.

Figure 2:
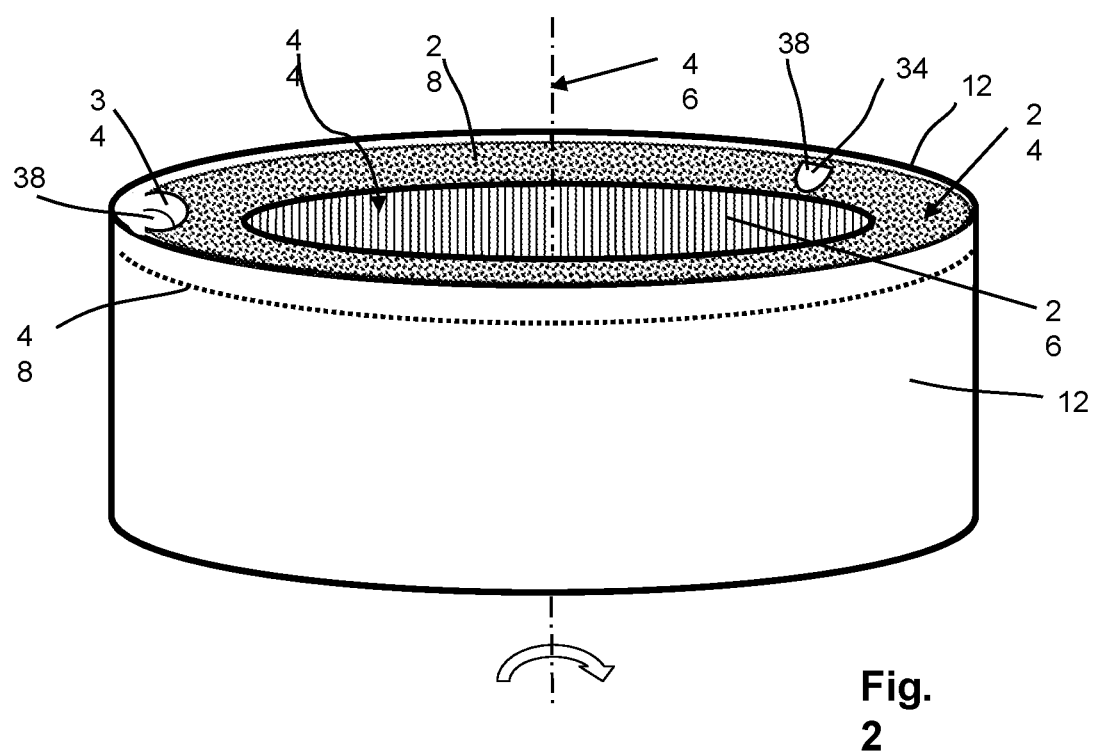
FIG. 2 is a schematic view laterally and obliquely from above of the housing base part of the filter device when the hollow filter element according to the invention is inserted.

FIG. 2 in turn shows schematically and in a perspective side view a hollow filter element 24 according to the invention that is inserted into a lower part 12 of the housing of an air filter device. A central axis 46 of the filter element 24 is marked in the center of the cavity 44. The surround 28 of the hollow filter element 24 that is shown in FIG. 2 is designed to be point-symmetrical with respect to a center located on the axis 46.

In this case, the surround 28 of the filter material 26 has two asymmetrically arranged grip recesses 34, by means of which the hollow filter element 24 can be handled by a person particularly easily for installation or removal, by a finger being placed in the grip recess and the thumb engaging in the cavity 44 of the filter element 24 that is enclosed by the surround 28, or vice versa, the thumb being put into the grip recess 34 and held thereagainst by the other fingers from the cavity 44. The grip recesses 34 are arranged far apart from one another in the surround 28, such that the best possible balance can be produced when lifting the filter element 24—in spite of asymmetry.

As can be seen on the left-hand edge in FIG. 2, a vertical wall of the grip recess 34 or the insertion part 38 does not necessarily have to be closed on all sides or annularly. The recessed grip 34 or the insertion part 38 can, for example, also be laterally open, such that engagement into the grip recess 34 can take place not only from above, but also from the outer edge of the filter element 26, from the side.

In addition to the use for handling the filter element 28 during installation or removal, one or more grip recesses 34, in conjunction with one or more pins 36 arranged on the housing cover 14, as shown in FIG. 1, can also be used to ensure a specified mounting position for the filter element 24. Specified mounting positions are required, for example, if the geometric ratios in the housing base part 12 have asymmetries to which the shape of the hollow filter element 24 is adapted.

The installation position of the hollow filter element 24 can be clearly determined by a grip recess 34 or by a suitable—e.g., not point-symmetrical—arrangement of a plurality of recessed grips 34 in a point-symmetric surround 28 of the hollow filter element 24, as shown in FIG. 2, and an associated pin 36 which is suitably arranged on the housing cover 14, or a plurality of such pins 36 associated with grip recesses 34, which pins each project into the grip recesses 34 associated therewith when the housing cover 14 is placed on and assembled. As such, a 180° rotation about the central axis 46 is ensured for the installation, and in particular for the reinstallation.

If the filter element 24 is inserted into the housing base part 12 upside down—i.e., when the elongate hollow filter elements shown by the Figures are rotated 180° about the axis 46—the cover which is coded with one or more pins 36 cannot be placed or assembled on the housing base part 12, because the pins collide with the surround 28 which is higher in relation to the grip recesses.

Also in the case of a hollow filter element 24 which was only temporarily removed, it is advantageous if the element assumes the same orientation as before when being re-inserted into the lower part 12 of the housing. This applies in particular when the filter element 24, which has an outer edging provided with a sealing material on the lower face, sealingly abuts an inside edging of the lower part 12 of the housing. In the assembly of the parts shown, such sealing edgings can come to rest on one another, e.g., at the height of the lower part 12 of the housing, which height is indicated by a dotted line 48. Since the sealing edge on the hollow filter element 24 adapts to or "seats" any irregularities of the lower housing part 12 over time due to the resilience of the material, it is favorable for optimum sealing between the inserted filter element 24 and the lower part 12 of the housing if, when the filter element 24 is reused after removal, the element is inserted into the lower part 12 of the housing in the same orientation as before, and therefore in an extremely precise fit.

If the pins 36 in the housing cover 14 have a corresponding length, and the grip recesses 34 have a sufficiently strong base, the pins 36 can also be used for additionally pressing the hollow filter element 24 into the lower part 12 of the housing. When the lid 14 is mounted on the lower part 12 of the housing, the pins 36 then come into contact with the relevant base of the grip recesses 34 and press the filter element 24 deeper into the seat thereof.

The invention claimed is:

1. A hollow filter element for interchangeably inserting into a filter device for filtering air, comprising:
    a filter material which is disposed around a cavity; and
    a planar surround enclosing the cavity, wherein the filter material is sealingly held on an end face thereof by the planar surround;
    wherein the planar surround has a grip recess for handling the hollow filter element,
    wherein the grip recess is arranged in the planar surround,
    wherein the grip recess is arranged outside of a cross section of the cavity, and
    wherein the grip recess is an inherently rigid insertion part.

2. The hollow filter element according to claim 1, wherein the planar surround has a plurality of grip recesses.

3. The hollow filter element according to claim 2, wherein the planar surround is point-symmetrical with respect to a center on a central axis and wherein the plurality of grip recesses are disposed asymmetrically in the planar surround based on a 180° rotation of the hollow filter element about the central axis.

4. The hollow filter element according to claim 1, wherein the grip recess is undercut.

5. A filter device, comprising:
   the hollow filter element according to claim 1; and
   a housing which includes:
      a housing base part which has an air outlet; and
         a housing cover which has an air inlet and which is placeable on the housing base part;
   wherein the hollow filter element is disposable in the housing such that the hollow filter element separates the air inlet from the air outlet;
   wherein the housing cover has a pin which, when the hollow filter element is correctly installed in the housing base part and the housing cover is placed on the housing base part, projects into the grip recess of the planar surround.

6. The filter device according to claim 5, wherein the pin has a length such that pressure is exertable on the grip recess by the pin.

* * * * *